UNITED STATES PATENT OFFICE.

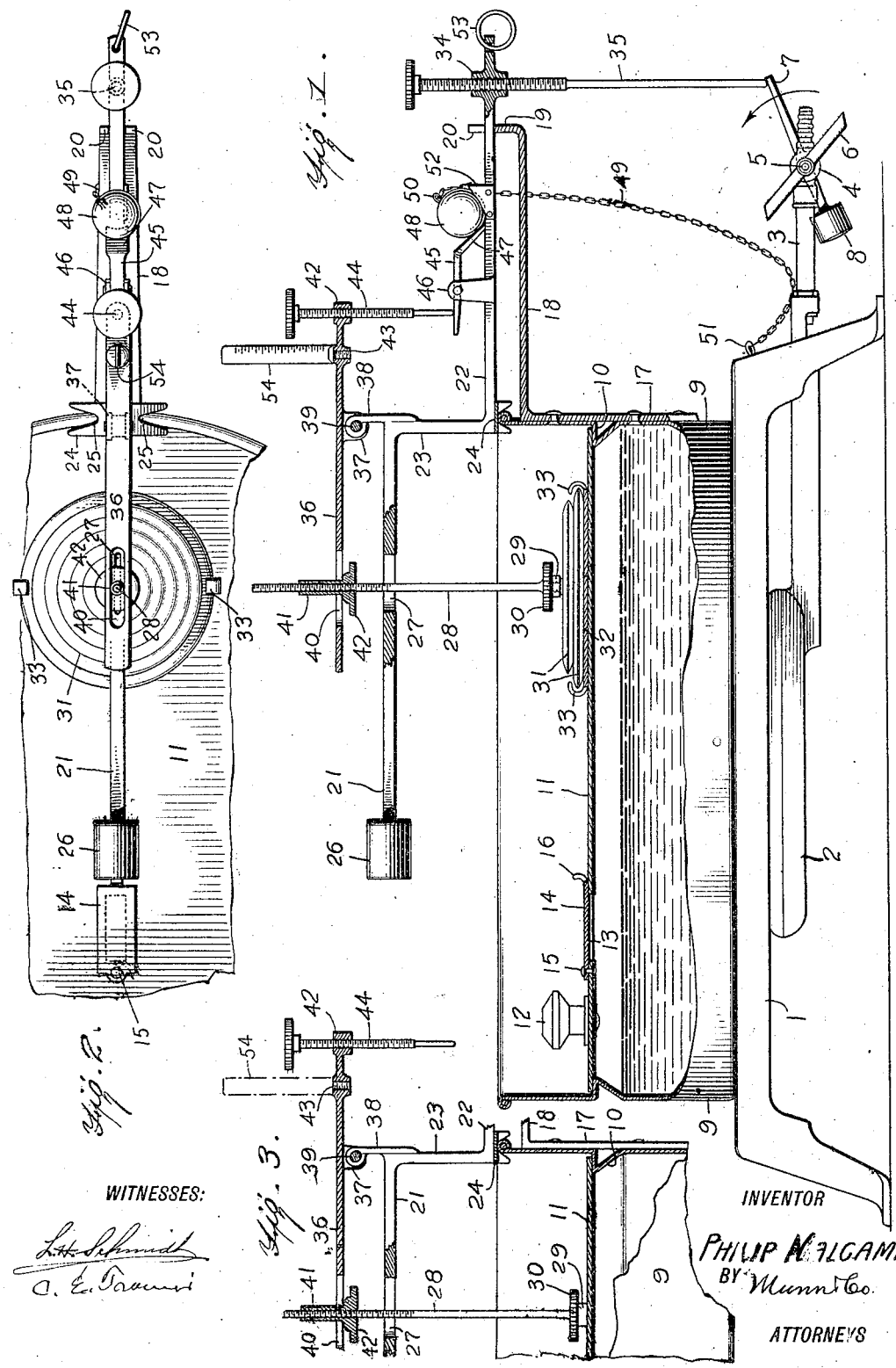

PHILIP MALCAMP, OF NEW ORLEANS, LOUISIANA.

PASTEURIZER.

1,179,126.   Specification of Letters Patent.   Patented Apr. 11, 1916.

Application filed December 6, 1915. Serial No. 65,260.

*To all whom it may concern:*

Be it known that I, PHILIP MALCAMP, a French citizen who has applied for naturalization in the United States, and a resident of New Orleans, in the parish of Orleans and State of Louisiana, have invented certain new and useful Improvements in Pasteurizers, of which the following is a specification.

My invention is an improvement in pasteurizers, and the invention has for its object to provide a device of the character specified, for use with gas stoves and the like, for pasteurizing milk, wherein mechanism is provided controlled by the heat of the milk being pasteurized for cutting off the flow of fuel to the heater when the milk has attained a predetermined temperature.

A further object is to provide a device of the character specified, which may be used in the same manner to cut off the fuel supply when the milk begins to boil, and controlled by the boiling of the milk.

In the drawings: Figure 1 is a side view with parts in section, of the improved pasteurizer in connection with a gas stove; Fig. 2 is a partial top plan view, and Fig. 3 is a sectional view, similar to Fig. 1, showing the device used as a sterilizer.

In the embodiment of the invention shown in Figs. 1 and 2, the improvement is shown in connection with a gas stove 1, of ordinary construction, having a burner 2, and a supply pipe 3 for supplying fuel to the burner. The fuel supplied to the burner is controlled by a valve in a casing 4, and the stem 5 of the valve has connected therewith at one end a cross head 6 for operating the valve, and at the other end a counter-balanced arm 7. This arm 7 extends transversely of the stem, and one end of the arm is provided with a weight 8, which normally acts to close the valve.

The milk to be pasteurized is arranged within a vessel 9, of ordinary form, which is arranged on the heater above the burner. This vessel or container is provided with an internal annular rib or ledge 10, and the cover 11 rests upon the ledge, as shown. The ledge 10 is so arranged that the cover 11 will be spaced slightly above the upper surface of that quantity of milk which it is desired to pasteurize, and the cover has a handle 12 for convenience in manipulating the same. The cover is also provided with a vent opening 13, which is normally closed by a plate or leaf 14, the said leaf or plate being pivoted to the cover at one end, as indicated at 15, and having at the other end a finger-piece 16 for convenience in manipulating the same.

An angle bracket is connected with the vessel, the said bracket comprising a vertical portion 17 which is secured to the vessel by rivets or the like, and a horizontal portion 18 extending radially from the vessel, and having at its outer end an upstanding lug 19, which is vertically slotted to form a pair of laterally spaced arms 20. A lever is provided, the said lever consisting of portions 21 and 22, parallel and offset laterally from each other, and extending in opposite directions and connected by an integral portion 23 perpendicular to both portions 21 and 22.

A saddle plate 24 is connected with the portion 22 of the lever, at its junction with the portion 22, and the said saddle plate is curved longitudinally, and is recessed longitudinally at its ends, as indicated at 25, in such manner that the saddle plate may be balanced on the beaded upper edge of the vessel, as shown in Figs. 1 and 2. The saddle is arranged to rock on the beaded edge, and the saddle supports the lever and the operating mechanism. A counter-weight 26 is mounted on the inner end of the portion 21 of the lever, and the said portion is provided with a longitudinally extending slot or passage 27 intermediate its ends. A rod 28 passes through this opening, and the lower end of the rod is provided with an internally threaded socket 29 and a milled or knurled wheel 30 above the socket, for convenience in rotating the rod. The socket is engaged by a threaded stem on a thermostat 31 of ordinary construction, which is held on the upper face of the cover by a holding plate 32 secured to the cover, and having overlying lugs 33 for engaging over the thermostat. The rod 28 extends above the portion 21 of the lever, and the outer end of the portion 22 of the lever is provided with a vertical internally threaded bearing 34. A rod 35 is supported by the bearing, the said rod having its upper end enlarged and threaded to engage the threads of the bearing, and the rod is provided with a milled head at its upper end for convenience in turning the same. The lower end of the rod engages that end of the arm 7 remote from the weight 8 and the said rod is designed to hold the valve in the casing 4 open under conditions to be presently described. A controlling lever 36 is mounted above the adjacent portions 21 and 22 of the lever, the said lever having a pair of lugs 37, which depend on opposite sides of a bearing arm 38 extending upwardly from the portion 23 of the lever, and a pivot pin 39 is passed through a registering opening in the lug and in the bearing lug for pivoting the lever to the lever 21—22—23. This controlling lever has a longitudinally extending slot 40 at its inner end registering with the slot 27 of the portion 21 of the lever 21—22, and the threaded end of the rod 28 passes through this slot.

A sleeve 41 is threaded onto the rod at the lever 36, the said sleeve extending above and below the lever and being adjustable on the rod, and having a marginal flange or head 42 at its lower end, for convenience in turning the same, and to engage the lever 36 under conditions to be presently described. The lever 36 is also provided at the end remote from the slot 40 with a vertical internally threaded bearing 42 and with a second bearing 43 near the lugs 47 and between said lugs and the bearing 42. A rod 44 is threaded through the bearing 42, the said rod having a knurled or milled head at its upper end for convenience in manipulating the same, and the lower end of the rod engages the adjacent end of a dislodging lever 45. This lever is pivoted between a pair of laterally spaced lugs 46 on the portion 22 of the lever 21—22, and the opposite end from the rod 44 has an angular portion 47, which engages beneath a ball weight 48. This weight 48 is balanced on the lever, in such manner that when the inner end of the lever 45 is depressed the weight will be dislodged and will roll off the portion 22 of the lever.

A flexible member 49, a chain in the present instance, is connected at one end to an eye 50 on the weight and at the other end to an eye 51 on the heater. The weight is constrained to fall off the lever at one side thereof, by means of a substantially triangular cam plate 52, which is secured to one edge of the portion 22 of the lever. The outer end of the portion 22 of the lever has an opening through which is passed a ring 53, and by means of this ring, the mechanism supported by the lever 21—22 may be suspended when not in use.

The operation of the device is as follows: The vessel 9 is partially filled with the milk to be pasteurized, as indicated in Fig. 1, and the parts are arranged as shown in the said figure. The rods 28, 35 and 44 are so adjusted that they will hold the valve in the casing 4 open so long as the weight 48 rests on the portion 22 of the lever. As soon, however, as this weight is dislodged, the weight 26 will overbalance the portion 22 of the lever, and will swing the rod 35 upward, a sufficient distance to permit the weight 8 to close the valve in the casing 4. When the thermostat expands a predetermined distance under the influence of the heat, the knurled head 42 of the sleeve 41 will engage beneath the adjacent end of the lever 36, and will move the inner end of the lever upward. The outer end of the lever will be moved downwardly and the rod 44 will swing the lever 45, which will dislodge the weight 48. The portion 22 of the lever normally rests on the lug 19 between the arms 20, and in this position the rod 35 will hold the valve open. The rod may be adjusted to hold the valve at the desired extent of opening, and by means of the sleeve 41 the weight may be dislodged at any desired temperature. When the device is not in use, it may be suspended by the ring 53. In pasteurizing milk, it is brought to a predetermined temperature below the boiling point, when the process of heating is checked. With the improvement, this heating process will be checked at any desired temperature.

In the embodiment of the invention shown in Fig. 3, the socket 29 of the rod 28 rests directly upon the cover 11, the thermostat being removed. The device is otherwise arranged precisely as shown in Fig. 1. With this arrangement, when the milk boils, the cover 11 will be lifted and the rod 28 will be moved upward, to swing the controlling lever to cause the rod 44 to operate the dislodging lever to dislodge the weight 48. The counterweight 26 will then overbalance the lever 21—22—23 to permit the weight 8 to be closed. The bearing 43 is designed for permitting a scale 54 to be connected with the controlling lever 36. The head of the screw 44 coöperates with the scale, and by means of the scale the screw 44 may be adjusted, to dislodge the weight 48 at any predetermined temperature. It will be obvious that when the screw 44 is turned down, a slighter and an earlier movement of the thermostat will cause the said rod 44 to dislodge the weight. On the contrary, when the screw is turned upward, a greater or a later movement on the part of the thermostat will be necessary to operate the dislodging lever 45 to dislodge the weight.

I claim:

1. A device of the character specified, comprising a container, a heater in coöperative relation with the container, fuel supplying means for the heater, a counterbalanced lever, connecting means between the counterbalanced lever and the fuel supplying means, means actuated by the rising of temperature of the contents of the container, a weight mounted loosely upon the counterbalanced lever, and a second lever adapted to be actuated by the primary temperature actuated means for effecting displacement of the weight from the said counterbalanced lever.

2. Heat controlling means, comprising a counterweighted lever adapted to be detachably mounted upon suitable supporting means, a second lever fulcrumed upon the counterweighted lever, heat actuated tripping means in conjoint relation with the said two members, heat controlling means connected with the said counterweighted lever, and a weight mounted loosely upon the counterweighted lever and adapted to be displaced when the said second lever is tripped.

3. Means of the character specified, comprising a counterweighted lever adapted to be detachably mounted upon a container, a stop connected with the container for holding said lever in normal position, heat controlled means connected with the said lever, a second lever mounted upon the counterweighted lever, heat actuated tripping means coacting with the two levers, a weight mounted loosely upon the counterweighted lever, and tripping means mounted upon the counterweighted lever for displacing the loose weight therefrom and adapted to be operated by the said second lever when the same is actuated by the heat actuated tripping means.

4. In combination with a container, the contents of which is adapted to be subjected to heat, a heater associated with such container and fuel regulating means, a lever mounted upon the container and adapted to operate the fuel controlling means, a second lever mounted upon the primary or first-mentioned lever, a temperature actuated device loosely connected with the primary lever, a stop adjustably mounted upon the temperature actuated device and adapted to trip the second lever, a weight loosely mounted upon the primary lever, a trip mounted upon the primary lever for displacing the weight therefrom, and adjustable means between the second lever and trip for regulating the period of actuation thereof.

5. A device of the character specified, comprising in combination with the heater, a valve controlling the flow of fuel thereto, the valve arm connected with the valve and counter-weighted to normally close the valve, of a container for the material to be heated, a cover for the container, a lever having means for balancing the same on the edge of the container, a rod threaded through the outer end of the lever and engaging the valve arm, said lever being balanced to normally lift the outer end thereof to permit the valve to close, a weight resting loosely on the lever near the outer end thereof and normally holding the valve open, a controlling lever pivoted on the first named lever, a dislodging lever pivoted on the first named lever and engaging the weight at one end, a rod threaded through the adjacent end of the controlling lever and engaging the other end of the dislodging lever, a thermostat on the cover, a rod connected with the thermostat, and means adjustable on the rod and adapted to engage the inner end of the controlling lever to cause the same to operate the dislodging lever.

6. A device of the character specified, comprising in combination with the heater and the counter-balanced means for controlling the flow of fuel to the heater, and normally cutting off the supply of fuel to the heater, of a container for the material to be pasteurized, a cover for the container, a lever having a saddle for engaging the rim of the container, said lever having means in connection with the outer end thereof and adjustable with respect thereto for engaging the counter-balanced controlling means, to maintain the supply of fuel to the heater, said lever being normally balanced to swing downward at its inner end to permit the fuel controlling means to shut off the supply, a weight supported on the lever near its outer end, and overbalancing the same, the container having means for limiting the downward movement of the outer end of the lever to a position where the fuel controlling means is open, and means controlled by the attainment of a predetermined heat within the container for dislodging the weight, said means comprising a controlling lever pivoted on the first named lever, a dislodging lever pivoted on the first named lever adjacent to the weight and having one end in engagement with the weight to dislodge the same when the other end of the lever is depressed, a rod having a threaded engagement with the adjacent end of the controlling lever and engaging the other end of the dislodging lever, a thermostat supported by the cover, a rod connected with the thermostat and extending upwardly, and a head adjustable on the rod for engaging the inner end of the controlling lever to operate the same.

7. A device of the character specified, comprising in combination with the heater and the counter-balanced means for controlling the flow of fuel to the heater, and normally cutting off the supply of fuel to the heater, of a container for the material to be pasteurized, a cover for the container, a lever having a saddle for engaging the arm of the container, said lever having means in connection with the outer end thereof and adjustable with respect thereto for engaging the counter-balanced controlling means to maintain the supply of fuel to the heater, said lever being normally balanced to swing downward at its inner end to permit the fuel controlling means to shut off the supply, a weight supported on the lever near its outer end, and overbalancing the same, the container having means for limiting the downward movement of the outer end of the lever to a position where the fuel controlling means is open, and means controlled by the attainment of a predetermined heat within the container for dislodging the weight, said means comprising a controlling lever pivoted on the first named lever, a dislodging lever pivoted on the first named lever adjacent to the weight and having one end in engagement with the weight to dislodge the same when the other end of the lever is depressed, means in connection with the controlling lever and engaging the dislodging lever and adjustable with respect to the dislodging lever for operating the same to dislodge the weight, and a thermostat supported by the cover and having means for engaging the inner end of the controlling lever to move the same to cause the said lever to operate the dislodging lever when a certain predetermined degree of heat is attained.

8. A device of the character specified, comprising in combination with the heater and the counter-balanced means for controlling the flow of fuel to the heater, and normally cutting off the supply of fuel to the heater, of a container for the material to be pasteurized, a cover for the container, a lever having a saddle for engaging the arm of the container, said lever having means in connection with the outer end thereof and adjustable with respect thereto for engaging the counter-balanced controlling means, to maintain the supply of fuel to the heater, said lever being normally balanced to swing downward at its inner end to permit the fuel controlling means to shut off the supply, a weight supported on the lever near its outer end and overbalancing the same, the container having means for limiting the downward movement of the outer end of the lever to a position where the fuel controlling means is open, and means controlled by the attainment of a predetermined heat within the container for dislodging the weight.

9. A device of the character specified, comprising in combination with the heater and the normally operative means for cutting off the supply of fuel thereto, the container for the material to be heated, and the cover for the container, of a lever having means for engaging the container to balance the lever thereon, the said lever having means at its outer end for engaging the fuel controlling means, the lever being balanced to permit the said means to shut off the fuel supply, a weight resting upon the lever and overbalancing the same to hold the fuel controlling means in open position, a thermostat in connection with the container, and means operated by the thermostat for dislodging the weight when a predetermined degree of heat has been attained.

PHILIP MALCAMP.

Witnesses:
ELIZABETH BRODERICK,
L. F. SAUVÉ.